United States Patent
Saoumi

(10) Patent No.: US 8,972,859 B2
(45) Date of Patent: Mar. 3, 2015

(54) EMBEDDED LEARNING MANAGEMENT SYSTEM

(75) Inventor: Ted Saoumi, New South Wales (AU)

(73) Assignee: Avaya Inc., Basking Ridge, NJ (US)

( * ) Notice: Subject to any disclaimer, the term of this patent is extended or adjusted under 35 U.S.C. 154(b) by 1325 days.

(21) Appl. No.: 12/360,910

(22) Filed: Jan. 28, 2009

(65) Prior Publication Data

US 2010/0192063 A1    Jul. 29, 2010

(51) Int. Cl.
 *G06F 3/00* (2006.01)
 *G06F 9/44* (2006.01)
 *G09B 19/00* (2006.01)

(52) U.S. Cl.
 CPC .......... *G06F 9/4446* (2013.01); *G09B 19/0053* (2013.01)
 USPC ............................. 715/707; 715/705; 715/709

(58) Field of Classification Search
 USPC .......................................... 715/707, 709, 760
 See application file for complete search history.

(56) References Cited

U.S. PATENT DOCUMENTS

| | | | |
|---|---|---|---|
| 5,754,939 A * | 5/1998 | Herz et al. ................... | 715/273 |
| 6,687,485 B2 * | 2/2004 | Hopkins et al. .............. | 715/705 |
| 2002/0083179 A1 * | 6/2002 | Shaw et al. ................... | 709/227 |
| 2005/0042593 A1 * | 2/2005 | Hopkins et al. .............. | 434/350 |
| 2007/0166672 A1 * | 7/2007 | Morita et al. ................ | 434/118 |
| 2008/0059882 A1 | 3/2008 | McKirchy | |
| 2010/0211515 A1 * | 8/2010 | Woodings et al. ............ | 715/777 |

* cited by examiner

Primary Examiner — Weilun Lo
Assistant Examiner — Truc Chuong
(74) Attorney, Agent, or Firm — Sheridan Ross P.C.

(57) ABSTRACT

The present invention provides a learning management system that is embedded in an application, operating system, or multiple applications. The learning management system is adapted to identify whether training courses would be desirable for a user, based on usage of one or more applications, installment of one or more applications, or occurrence of one or more key words within an application.

22 Claims, 6 Drawing Sheets

EMBEDDED LEARNING MANAGEMENT SYSTEM

FIELD OF THE INVENTION

The invention relates generally to computing devices and methods and more particularly to mechanisms for assisting user learning.

BACKGROUND

Learning a new computer system or application is never an easy task, especially for novice computer users. Experienced computer users tend to know how to navigate application help wizards and other help resources when trying to figure out how to solve a problem. However, less experienced users tend to try and solve new problems with old methods that they are comfortable with (i.e., they try to use a nail when a screw would solve the problem more efficiently and effectively).

Manual learning management systems provide users with a plan to schedule training, track course progress, and provide feedback after the course and other training activities. While learning management systems allow people to periodically update their course requests and the like (manually), current systems are based on a user, or their supervisor, reading over a list of courses and making a determination as to the most appropriate course or set of courses that will help the user learn the necessary skills to tackle a problem.

Some automated application help mechanisms exist, however, those solutions are limited to a single application (i.e., the help wizard is application specific). Each application has a different and dedicated help wizard. While this solution may be useful for a user trying to learn one specific application, it is rarely helpful for a user trying to become more efficient across multiple applications and possibly utilizing multiple media types (e.g., a new contact center agent in a contact center setting typically needs to learn multiple applications to handle different media types). Additionally, since help wizards are used for specific applications and do not share information (or learned things about the user's behavior) beyond the application currently being used, existing help wizards are limited. For example, a help wizard in a word processing application can display help suggestions for creating basic tables that contain summarized data, but if the user is trying to utilize the word processing application to create a more extensive table, the help wizard in the word processing application will likely be of little to no value. More specifically, the word processing help wizard is not aware of other applications that could be used more effectively to create a more extensive table and if the user is unaware of that other application, then the likelihood of that user learning about the other application and how to use it is greatly reduced.

SUMMARY

Accordingly, there exists a need for a single learning management system (LMS) that is capable of monitoring user input across multiple applications and then providing help suggestions, course suggestions, and other tips related to those multiple applications as well as other applications that were not active at the time the user input was received. Therefore, a holistic approach in solving the problems described above is needed.

These and other needs are addressed by various embodiments and configurations of the present invention. It is thus one aspect of the present invention to provide an LMS embedded in an operating system of a computing device. Alternatively, or in addition, it is one aspect of the present invention to provide an LMS that is capable of monitoring multiple applications on multiple computing devices (e.g., multiple resources such as contact center agents in a contact center). The LMS may be capable of monitoring multiple users across multiple communication mediums (e.g., voice, email, text, SMS messaging, Instant Messaging (IM), and the like) and multiple applications to determine if the users are employing the applications with the greatest amount of efficiency. If the user's are not efficiently utilizing all of the applications, then the LMS may be adapted to reference a list of course suggestions, tutorials, and other tips to provide the user with a suggested detailed and personalized training program that includes relevant courses, tutorials, and tips.

In accordance with at least some embodiments of the present invention, a method is provided. The method generally comprises:

receiving user input in connection with a first application on a first communication device;

receiving model user behavior input for multiple applications, including the first application;

comparing the user input to the model user behavior input for two or more of the multiple applications;

determining, based on the comparison step, that the user of the first application is not utilizing the first application with an acceptable amount of efficiency; and providing the user with training suggestions.

In addition to triggering the preparation and transmission of training suggestions, embodiments of the present invention also provide for triggers based on other events such as, for example, the occurrence of a key word more than a predetermined number of times on a particular communication device, supervisor requests, poor customer feedback, or the like.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to provide a learning management system.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
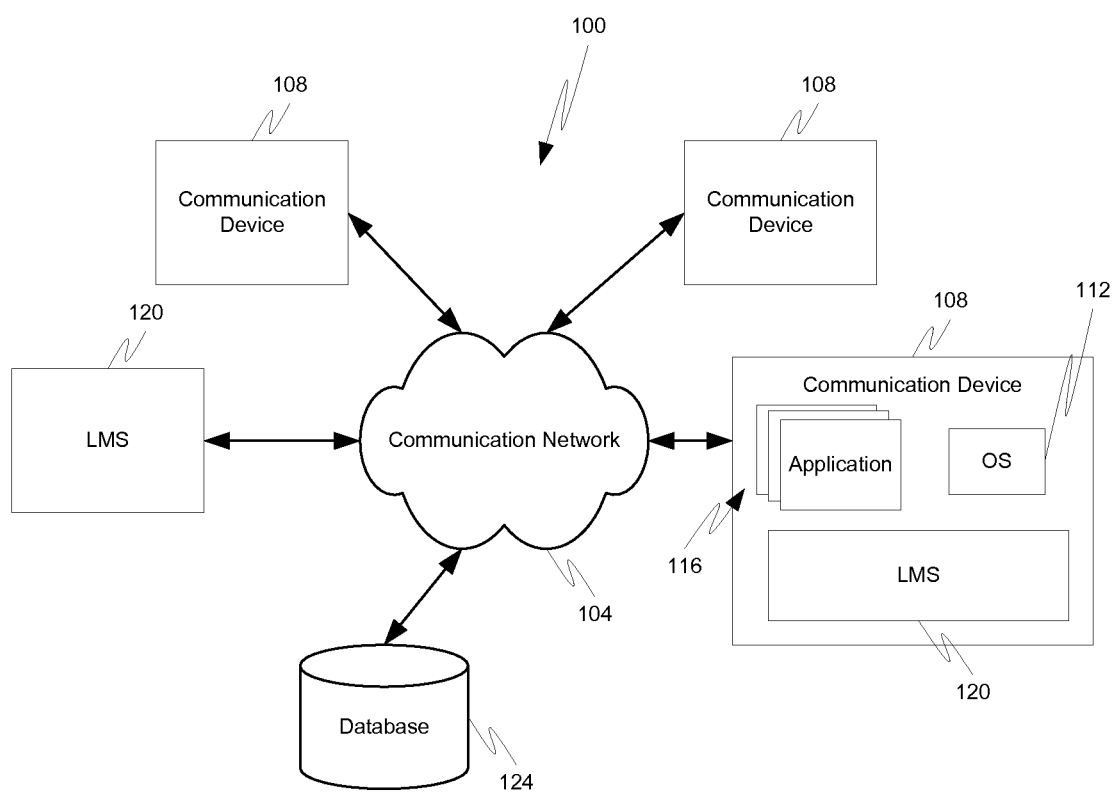
FIG. 1 is a block diagram depicting a communication system in accordance with at least some embodiments of the present invention.

Referring initially to FIG. 1, an exemplary communication system 100 will be described in accordance with at least some embodiments of the present invention. In accordance with at least one embodiment of the present invention, a communication system 100 may comprise one or more communication devices 108 that may be in communication with one another via a communication network 104. The communication devices 108 may be any type of known communication or processing device such as a personal computer, laptop, tablet PC, Personal Digital Assistant (PDA), cellular phone, smart phone, telephone, contact center resource, or combinations thereof. In general each communication device 108 may be adapted to support video, audio, and/or data communications with other communication devices 108.

The communication network 104 may comprise any type of information transportation medium and may use any type of protocols to transport messages between endpoints. The communication network 104 may include wired and/or wireless communication technologies. The Internet is an example of the communication network 104 that constitutes an IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types.

In accordance with at least some embodiments of the present invention, the communication devices 108 may comprise an operating system 112, a number of specific applications 116, and an embedded Learning Management System (LMS) 120. The operating system 112 is generally a high level application that enables a user to navigate and utilize the other applications 116 stored on the communication device 108. The specific applications 116 may include word processing applications, editing applications, spreadsheet applications, communication applications (with various applications for various communication mediums), web browsing applications, and any other type of known or yet to be developed application.

The LMS 120 may be provided as a part of the operating system 112 or as a separate element in the communication device 108. More specifically, the LMS 120 is generally not included in a single application 116 for helping a user in that particular application but is, instead, a higher-level user monitoring and learning suggestion module. In accordance with at least some embodiments of the present invention, the LMS 120 may be adapted to monitor a user's input across all applications 116 as well as the operating system 112 to determine if the user is utilizing all of the applications 112, 116 as efficiently as possible. If the LMS 120 determines that certain suggestions could be provided to the user to help use a particular application 112, 116 more effectively or solve a particular problem with a different application, then the LMS 120 may be adapted to generate a suggested solution or training course for the user.

As can be seen in FIG. 1, an LMS 120 does not necessarily need to reside on each communication device 108. Rather, a central LMS 120 may be provided to oversee multiple communication devices 108. This may be particularly useful in contact center settings, small and large enterprises, and other environments having a number of communication devices associated with one another either via a LAN, WAN, a common cellular communication network, or based on their physical proximity. The LMS 120 may be adapted to monitor each user at each communication device 108 connected to the communication network 104 and provide help tips or learning course suggestions, if necessary, based on the user's employment of one or more applications 112, 116 or communication mediums. These learning suggestions may be provided by an internal suggestion library or from an external database 124. The database 124 may also comprise data that helps the LMS 120 determine whether a user is employing the communication device 108 as efficiently as possible (e.g., by comparing the user's actions to actions of model user's).

Figure 2:
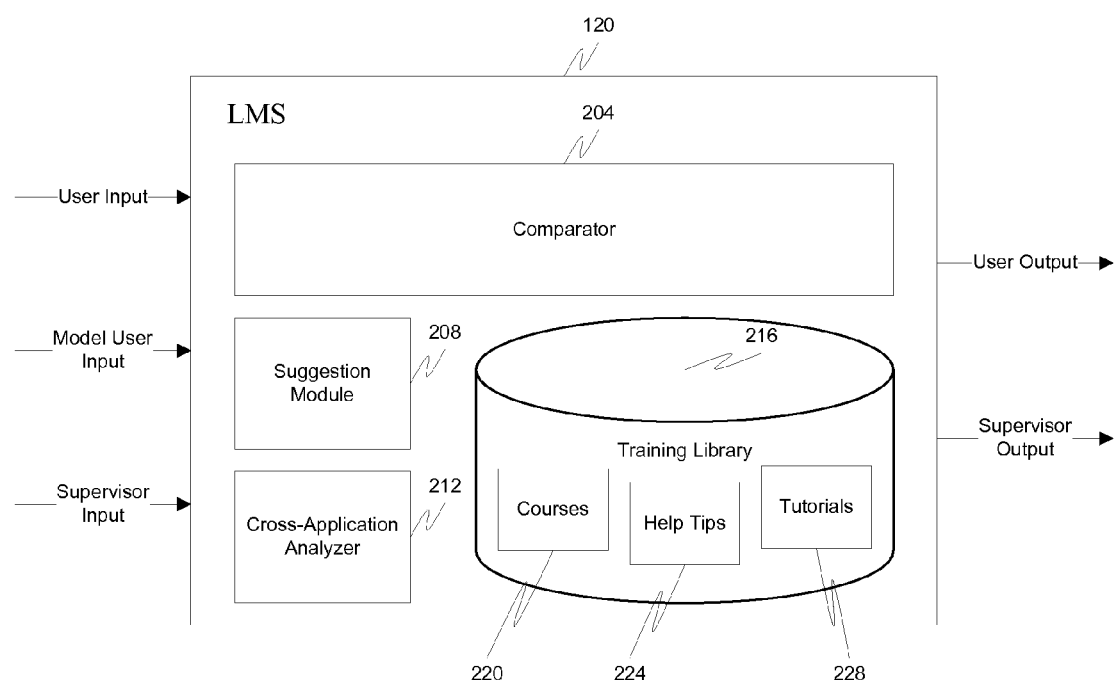
FIG. 2 is a block diagram depicting an exemplary learning management system in accordance with at least some embodiments of the present invention.

Referring now to FIG. 2, an exemplary LMS 120 will be described in further detail in accordance with at least some embodiments of the present invention. The LMS 120 may comprise a comparator 204, a suggestion module 208, a cross-application analyzer 212, and a training library 216.

A number of inputs may be received at the LMS 120 including, without limitation, a user input, a model user input, and a supervisor input. The user input may correspond to user input from a particular communication device 108 or from a plurality of different communication devices 108 (i.e., the LMS 120 may receive user input for a plurality of different users at substantially the same time). User input may also include information related to data received by a user. For example, email and files may be analyzed by the LMS 120 as another form of user input. If certain words appear more than a predetermined number of times (e.g., "program management" is found in more than X number of emails, voicemails, and files, then this information may be included in the user input and may be used to trigger certain training suggestions).

The model user input may correspond to habits, tendencies, or best known practices for utilizing one or more applications or communication modalities on a particular communication device 108 or a number of different communication devices 108. For example, the LMS 120 may be adapted to suggest that a user employ a different communication device 108 to address a particular problem. Thus, the model user input may correspond to model usage across multiple applications as well as communication devices. The supervisor input may correspond to training suggestions or input that can be input by a user's supervisor.

The comparator 204 may be adapted to receive all of the above-noted inputs and determine if the user or user's are utilizing their respective communication devices 108 or applications 112, 116 on those communication devices 108 as efficiently as possible. More specifically, the comparator 204 may be adapted to compare the user input to the model user input to determine if the user input is within a predetermined efficiency threshold of the model user input. The comparator 204 may also be operable to invoke a cross-application analyzer 212 to analyze a user's efficiency across multiple applications or communication modalities. Additionally, the cross-application analyzer 212 may be employed to determine if a particular problem can be addressed by some application that the user does not currently have open on the communication device 108.

If the user input is not within that threshold, or if the supervisor input recommends that user training is desirable, then the comparator 204 may invoke the suggestion module 208 to provide one or more training suggestions to the user. The suggestion module 208 is adapted to refer to the training library 216 when formulating such suggestions. The training library 216 may comprise training courses 220, help tips 224, and/or tutorials 228. One or more of these elements may be included in training suggestions for the user by the suggestion module 208. Once training suggestions have been formulated by the suggestion module 208, the LMS 120 may transmit the training suggestions to the user(s) via the user output. Additionally, the LMS 120 may comprise a supervisor output that can be used to forward a copy of training suggestions sent to a user to the user's supervisor.

The suggestion module 208 may further comprise a profile of the user to further understand the user's needs. For example, the user's profile may include occupation, education, and experience, as well as interests of the user and where the user resides such that it can vary its suggestions for training to be customized for that user. Coupling the user profile information with feedback from the user input will help the LMS 120 "learn" about the user's needs and better suggest training courses. More specifically, the suggestion module 208 can provide in-person training sessions if such sessions will be occurring within a predetermined radius of the user's known location. Additionally, the suggestion module 208 can eliminate certain possible suggestions if the suggestion module knows that the user's skills are beyond a certain level (e.g., the user is not a novice user, so beginner courses can be eliminated for most applications). Moreover, if the suggestion module 208 notices that certain training suggestions are accepted by a user, then the suggestion module 208 may retain this information and use it to provide related, possibly more advanced, training suggestions at a later time.

Figure 3:
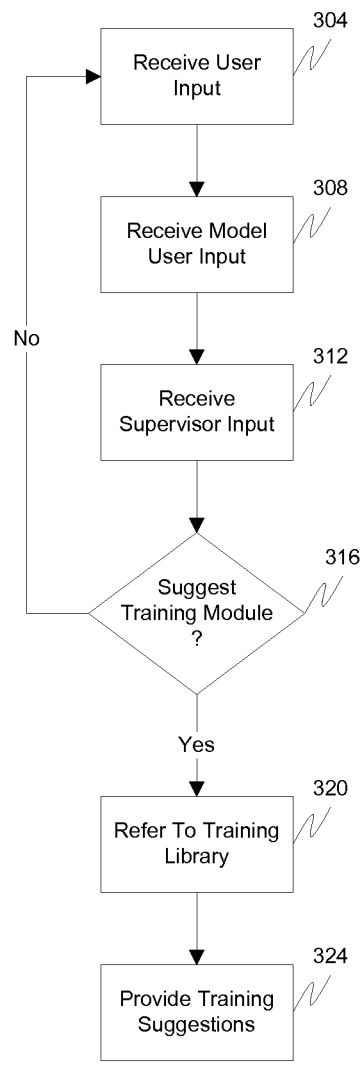
FIG. 3 is a flow diagram depicting a first learning method in accordance with at least some embodiments of the present invention.

With reference now to FIG. 3, an exemplary learning method will be described in accordance with at least some embodiments of the present invention. The method is initiated when user input is received at the LMS 120 (step 304). Thereafter, model user input (step 308) and supervisor input (step 312) is received at the LMS 120. These inputs may be received from one or more communication devices 108 and/or one or more applications 112, 116.

The LMS 120 receives the various inputs and determines whether a training module or training suggestions should be provided to the user (step 316). This determination may be made unilaterally if the supervisor input suggests that training is necessary. Alternatively, or in addition, this determination may be made by comparing user input with model user input and determining if the user is not achieving optimal efficiency with the various applications. Still alternatively, or in addition, this determination may be made when a new application is installed on the communication device 108 or if certain key words occur more than a predetermined number of times on various media within a predetermined amount of time.

If none of these conditions are met, then the method returns to step 304. If it is determined that a training module is to be suggested, then the method proceeds by referring to the training library 216 (step 320). In this step, the LMS 120 may identify courses 220, tips 224, and/or tutorials 228 for the user that are based upon information learned about the user, the user's profile, or based on general suggestions.

After appropriate training suggestions have been identified by the LMS 120, the method continues with the LMS 120 providing the suggestions to the user via the user output (step 324). The suggestions may be provided to the user as a pop-up, email, or some other text, video, or audio medium. The user's reaction to this suggestion may be monitored as an additional form of user input. Thereafter, the method ends or returns to step 304.

Figure 4:
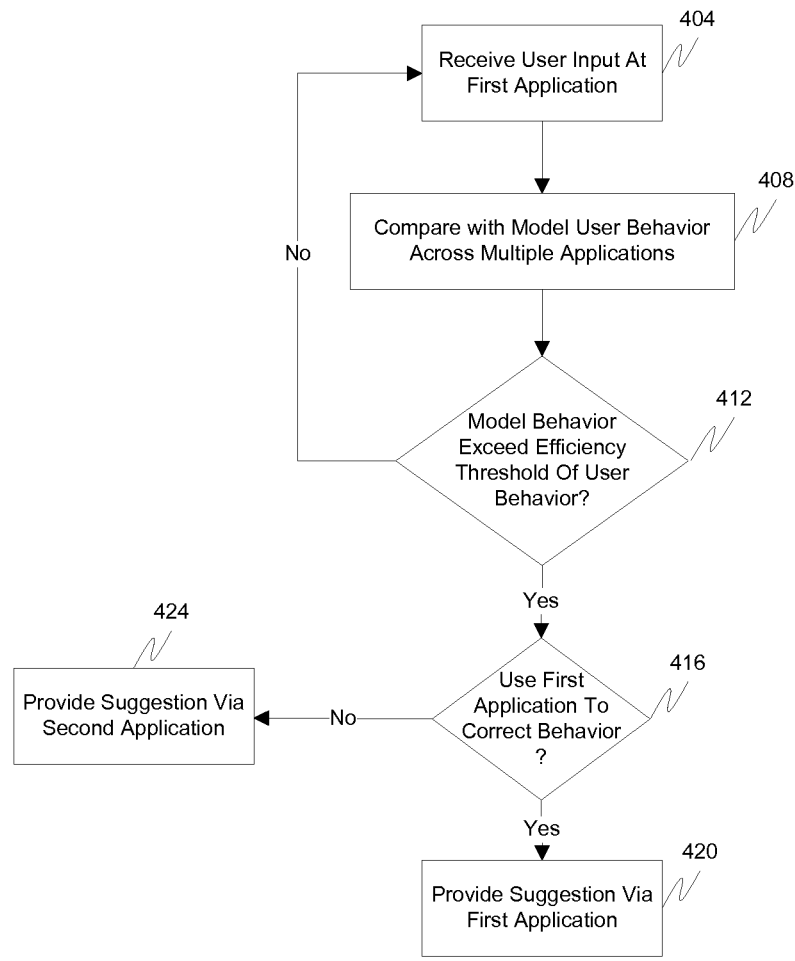
FIG. 4 is a flow diagram depicting a second learning method in accordance with at least some embodiments of the present invention.

With reference now to FIG. 4, another learning method will be described in accordance with at least some embodiments of the present invention. The method begins when user input is received in connection with a first application (step 404). This user input may be related to actions of the user in connection with the first application, files or words used in the first application, or combinations thereof.

The LMS 120 then compares the received user input with model user behavior across several applications (step 408). In this step, the LMS 120 invokes the cross-application analyzer 212 to analyze the user's input and compare it with model user input for that application and any other application that may be used to solve the problem being addressed by the user. Furthermore, the LMS 120 compares model user behavior for each of those applications.

Thereafter, the LMS 120 determines if any other actions on the current application or other applications may be taken to help the user operate more efficiently (step 412). More specifically, the LMS 120 determines if the model user behavior for the task being accomplished by the user exceeds an efficiency threshold of the user behavior as determined by the user input.

Based on this determination, the LMS 120 determines if the first application is the application that can be used to correct the user's less than efficient behavior (step 416). If the first application is suitable for use to correct the user's behavior, then the LMS 120 provides a learning suggestion or set of suggestions for the first application (step 420). This suggestion may be provided via the first application as a pop-up within that application or as an email.

Alternatively, if there is another application that can be used to accomplish the task currently being performed by the user (e.g., the user is currently trying to utilize a word processing application to complete pivot tables or is currently trying to utilize a simple text application to respond to an email), then the LMS 120 will provide the user with a suggestion to utilize a second (or third) application (step 424). This suggestion may be provided via the first application as a pop-up window or via the second application. More particularly, the LMS 120 may invoke and open the second application and provide a pop-up window upon start-up. As another alternative, the LMS 120 may provide the suggestion to utilize the second application via an email or other out-of-band communication (e.g., text message, voicemail, postal mail, etc.).

Figure 5:
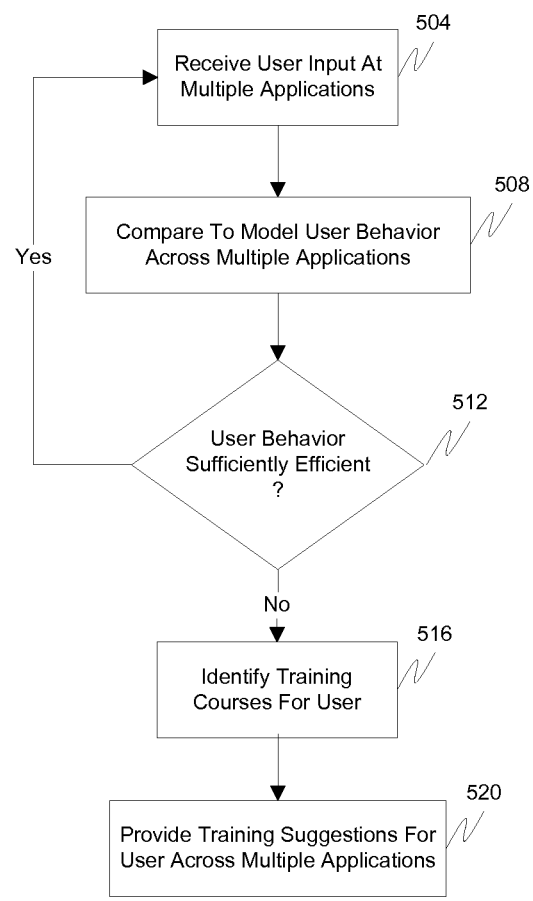
FIG. 5 is a flow diagram depicting a third learning method in accordance with at least some embodiments of the present invention.

FIG. 5 depicts another learning method in accordance with at least some embodiments of the present invention. The method begins when user input is received across multiple applications, and possibly from multiple communication devices 108 (step 504). The received input is compared to model user behavior across multiple applications, and possibly from multiple communication devices 108 (step 508). The user input may be compared to model user behavior across each application where user input is being received. Alternatively, model user behavior may be received from more applications than which user input is being received. For example, user input may be received from two applications and compared to model user behavior from three or more applications.

The LMS 120 continues by determining if the user behavior is sufficiently efficient based on the comparison between the received user input and the model user input (step 512). If the user behavior is sufficiently efficient, then the method returns to step 504. If, on the other hand, the user behavior is not sufficiently efficient, then the method continues with the LMS 120 identifying one or more training courses for the user (step 516). The training courses may be related to one or more of the applications from which user input was received or from which model user behavior was received. Alternatively, the suggestions may be for other applications or other courses not available via an application.

After the training courses have been identified, the method continues with the LMS 120 providing the identified training suggestions to the user across one or more of the applications that are being used (step 520). As described before, the training suggestions may alternatively be provided to the user via an email message or some other type of communication.

Figure 6:
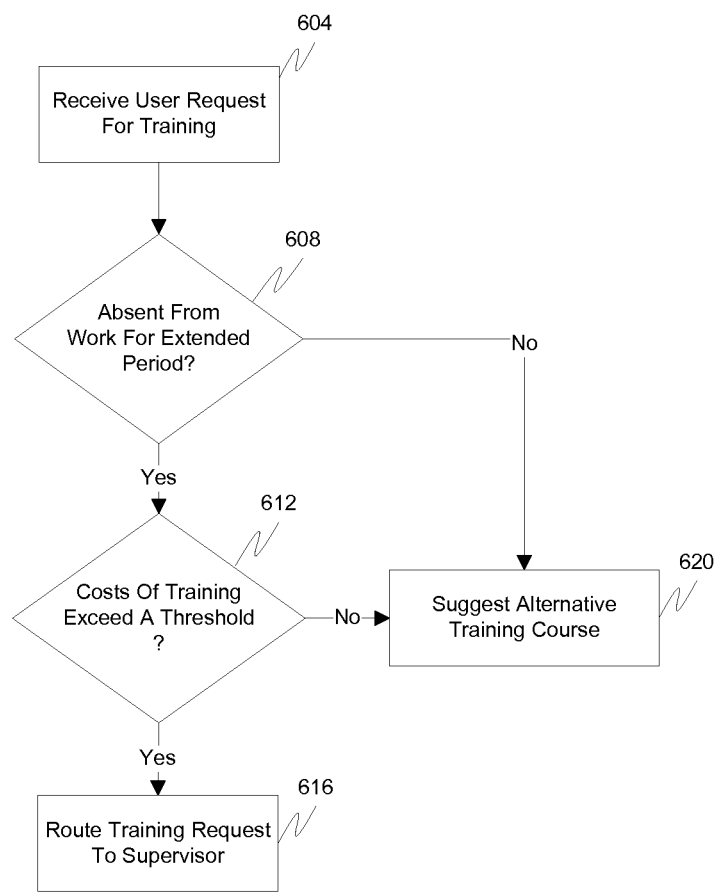
FIG. 6 is a flow diagram depicting a remote training method in accordance with at least some embodiments of the present invention.

Referring now to FIG. 6, a remote training method or method of determining whether remote training is justifiable will be described in accordance with at least some embodiments of the present invention. The method is initiated when a user request for remote training is received at the LMS 120 (step 604). This request may be received when a user responds to the training suggestion(s) provided to the user. Alternatively, this request may be unsolicited and sent unilaterally by the user.

The method continues with the LMS 120 determining whether user will be absent from work for an extended period of time (step 608). If the user will not be absent from work for an extended period of time, then a remote training session may not be justified (e.g., it may be more efficient for the user to wait for an in office training). If this query is answered negatively, then the method continues to step 620 where the LMS 120 suggests an alternative training course (perhaps in-house or a less expensive remote training course).

However, if the query is answered affirmatively, then the method continues with the LMS 120 determining whether the costs of the training course exceed a particular threshold (step 612). If so, the method continues to step 620. If the cost threshold is not exceeded, then the method continues with the LMS 120 routing the remote training request to the user's supervisor (step 616). Thus, the LMS 120 is operable to act as a filter for unreasonable training requests and can allow reasonable training requests to be passed on to the user's supervisor.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for monitoring user behavior and providing suggestions for enhancing usage efficiency of one or more applications. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving user input, at a learning management system, in connection with a first application on a first communication device;
receiving, at the learning management system, model user behavior input for multiple applications, wherein the multiple applications include the first application and at least one other application that is different from the first application, and wherein the at least one other application is not active at the time the user input is received;
comparing, by the learning management system, the user input to the model user behavior input for two or more of the multiple applications, wherein the model user behavior input corresponds to at least one of habits, tendencies, and best known practices for utilizing one or more of the multiple applications;
determining, by the learning management system and based on the comparison step, that the user of the first application is performing a task and that the task is not being performed within an acceptable amount of efficiency;
determining whether the task can be performed within the acceptable amount of efficiency by the user utilizing the first application or a different second application; and
providing the user with first training suggestions for the first application when it is determined that the task can be performed within the acceptable amount of efficiency utilizing the first application and providing the user with second training suggestions for the second application when it is determined that the task can be performed within the acceptable amount of efficiency utilizing the second application.

2. The method of claim 1, wherein the first or second training suggestions are provided in the first application.

3. The method of claim 2, wherein prior to determining that the user of the first application is performing a task, the method further comprises:
receiving, at the learning management system, supervisor input from a supervisor of the user indicating that training of the user is required, wherein the learning management system determines to provide the first or second training suggestions based at least partially on the supervisor input.

4. The method of claim 1, wherein the second training suggestions are provided in the second application.

5. The method of claim 4, further comprising opening the second application and displaying a pop-up window within the second application, the pop-up window providing the second training suggestions even though the user input was received at the learning management system from the first application.

6. The method of claim 1, wherein the first or second training suggestions are provided via an email message.

7. The method of claim 1, further comprising receiving user input at the learning management system from a number of different applications, including the first application.

8. The method of claim 1, further comprising sending a notification to the user's supervisor that the first or second training suggestions have been provided to the user.

9. The method of claim 1, further comprising maintaining a user profile and customizing the first or second training suggestions based on information in the user profile, wherein the user profile includes information about interests of the user.

10. The method of claim 1, further comprising:
referencing a training library;
identifying one or more of courses, help tips, and tutorials to include in the first or second training suggestions; and
including information about the identified one or more courses, help tips, and tutorials in the first or second training suggestions provided to the user.

11. The method of claim 1, further comprising:
receiving a training request for a remote training session from a remote user;
determining whether the remote training session is economically justifiable; and
controlling a forwarding of the training request to a supervisor of the remote user based on the results of determining whether the remote training session is economically justifiable.

12. A non-transitory computer readable storage medium comprising processor executable instructions operable to perform the method of claim 1.

13. A communication device, comprising:
a processor;
a data storage medium comprising instructions stored thereon, the instructions configured to be executed by the processor and including:
an operating system;
a plurality of applications, wherein the plurality of applications include a first application and at least one other application that is different from the first application; and
a learning management system configured to receive user input from each of the plurality of applications, receive model user behavior input for at least one of the plurality of applications, compare the user input received in connection with the first application to the model user behavior input, and determine that the user of the first application is performing a task and that the task is not being performed within an acceptable amount of efficiency, determine whether the task can be performed within the acceptable amount of efficiency by the user utilizing the first application or a different second application, provide the user with first training suggestions for the first application when it is determined that the task can be performed within the acceptable amount of efficiency utilizing the first application and provide the user with second training suggestions for the second application when it is determined that the task can be performed within the acceptable amount of efficiency utilizing the second application, wherein the at least one other application is not active at the time the user input is received, and wherein the model user behavior input corresponds to at least one of habits, tendencies, and best known practices for utilizing one or more of the multiple applications.

14. The communication device of claim 13, wherein the learning management system is part of the operating system and wherein the first training suggestions are related to learning about the first application.

15. The communication device of claim 13, wherein the second training suggestions are related to learning about the second application that is different from the first application.

16. The communication device of claim 15, wherein the learning management system is further operable to open the second application and prepare a pop-up window within the second application for displaying the second training suggestions.

17. The communication device of claim 13, wherein the first or second training suggestions are provided via an email message.

18. The communication device of claim 13, wherein the plurality of applications include the second application.

19. The communication device of claim 13, wherein the learning management system is further operable to send a notification to the user's supervisor that the first or second training suggestions have been provided to the user.

20. The communication device of claim 13, wherein the learning management system is operable to maintain a user profile and customize at least one of the first and second training suggestions based on information in the user profile.

21. The communication device of claim 13, wherein the learning management system is further operable to reference a training library, identify one or more of courses, help tips, and tutorials to include in the first or second training suggestions, and include information about the identified one or more courses, help tips, and tutorials in the first or second training suggestions provided to the user.

22. The communication device of claim 13, wherein the learning management system is further operable to receive a user training request for a remote training session, determine whether the remote training session is justifiable, and provide the user training request to a supervisor of the user in the event that the remote training session is justifiable.

* * * * *